United States Patent
Richardson

(10) Patent No.: US 11,865,695 B2
(45) Date of Patent: Jan. 9, 2024

(54) HUMANOID HUGGING ASSEMBLY

(71) Applicant: Walton Richardson, Murfreesboro, TN (US)

(72) Inventor: Walton Richardson, Murfreesboro, TN (US)

( * ) Notice: Subject to any disclaimer, the term of this patent is extended or adjusted under 35 U.S.C. 154(b) by 170 days.

(21) Appl. No.: 17/527,841

(22) Filed: Nov. 16, 2021

(65) Prior Publication Data

US 2023/0150143 A1 May 18, 2023

(51) Int. Cl.
*B25J 11/00* (2006.01)
*B25J 19/02* (2006.01)
*B25J 13/08* (2006.01)
*B25J 9/16* (2006.01)

(52) U.S. Cl.
CPC ........... *B25J 11/009* (2013.01); *B25J 9/1682* (2013.01); *B25J 9/1694* (2013.01); *B25J 13/081* (2013.01); *B25J 19/021* (2013.01)

(58) Field of Classification Search
CPC ...... B25J 11/009; B25J 9/1682; B25J 9/1694; B25J 13/081; B25J 19/021
See application file for complete search history.

(56) References Cited

U.S. PATENT DOCUMENTS

| 9,901,192 | B2 | 2/2018 | Tiggett, Jr. | |
| 2002/0198626 | A1* | 12/2002 | Imai | G06N 3/008 700/245 |
| 2005/0197739 | A1 | 9/2005 | Noda | |
| 2009/0055001 | A1 | 2/2009 | Stiehl | |
| 2010/0141197 | A1* | 6/2010 | Moon | B25J 9/1638 318/566 |
| 2017/0140259 | A1* | 5/2017 | Bergstra | G06N 3/044 |
| 2019/0143528 | A1* | 5/2019 | Hayashi | B25J 13/003 700/245 |
| 2019/0366558 | A1 | 12/2019 | Gupta | |

* cited by examiner

*Primary Examiner* — Adam R Mott
*Assistant Examiner* — Alyzia N Dilworth

(57) ABSTRACT

A humanoid hugging assembly includes a humanoid animatronic that has a torso, a pair of arms and a pair of hands each is disposed on a respective one of the arms. The arms are positionable in a resting position having the arms extending downwardly along the torso and having a palm of each of the hands facing the torso. Each of the arms is positionable in a hugging position has each of the arms is crossed in front of the torso wherein the pair of arms is configured to embrace the user. A motion sensor is integrated into the humanoid animatronic to sense motion of the user approaching the humanoid animatronic. A motion unit is integrated into the humanoid animatronic and the motion unit actuates each of the arms into the hugging position when a predetermined duration of time has passed when motion sensor senses motion.

6 Claims, 3 Drawing Sheets

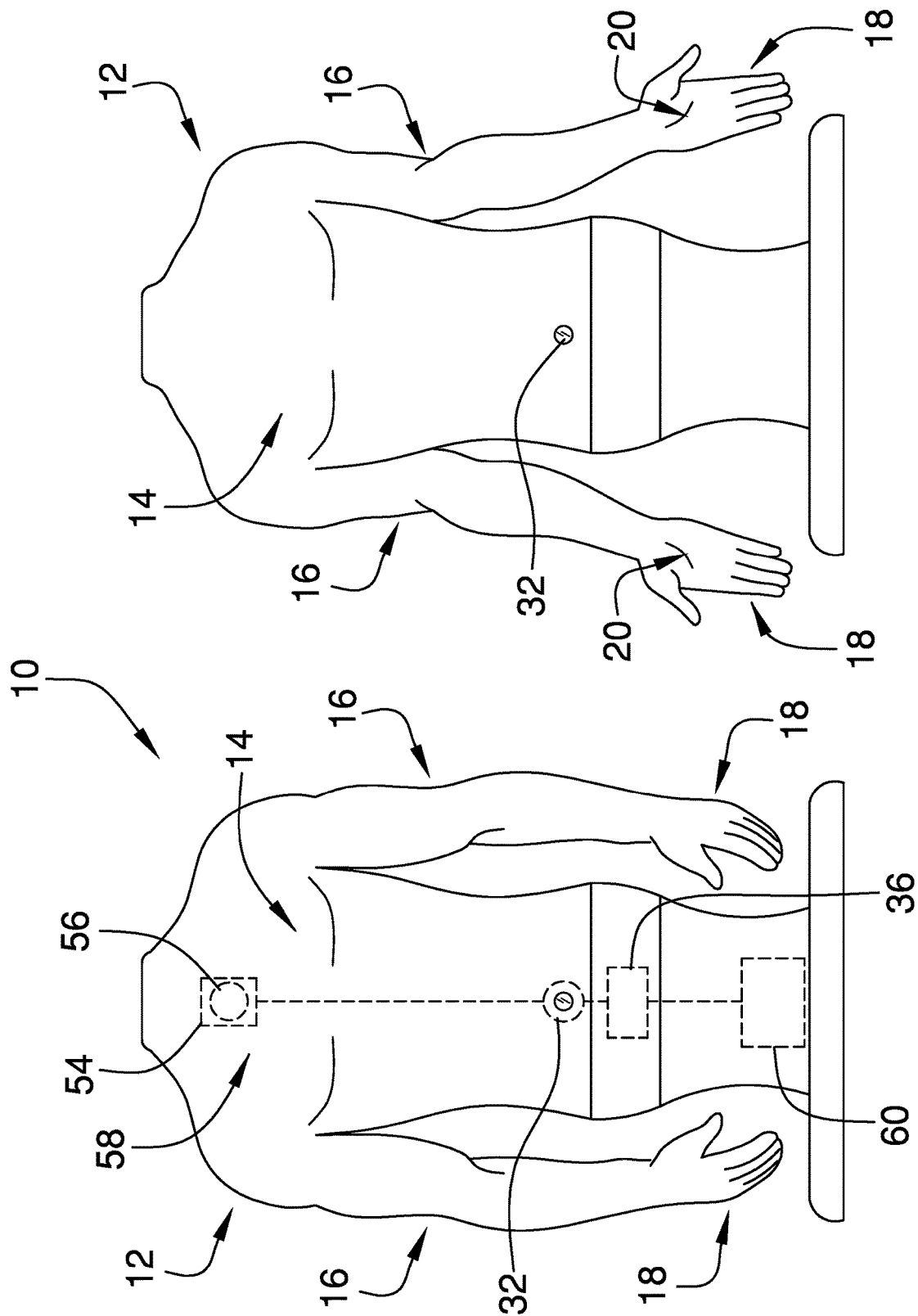

HUMANOID HUGGING ASSEMBLY

STATEMENT REGARDING FEDERALLY SPONSORED RESEARCH OR DEVELOPMENT

Not Applicable

CROSS-REFERENCE TO RELATED APPLICATIONS

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) FIELD OF THE INVENTION

The disclosure relates to hugging device and more particularly pertains to a new hugging device for giving a user a hug. The device includes a humanoid animatronic that includes a plurality of servos integrated into a pair of arms of the humanoid animatronic. The device includes a motion sensor and each of the arms is actuated into a hugging position when the motion sensor senses motion to give the user a hug. The device includes a speaker that emits a variety of affirming phrases when the user receives the hug.

(2) DESCRIPTION OF RELATED ART INCLUDING INFORMATION DISCLOSED UNDER 37 CFR 1.97 AND 1.98

The prior art relates to hugging devices including a robotic mannequin for displaying clothing which has moving arms and legs and a moving head. The prior art discloses a behavior control system for a robotic apparatus for modifying displayed behaviors of the robotic apparatus. The prior art discloses an interactive system to facilitate a sentient being to interact with a robotic companion which involves the robotic companion responding to activity of the sentient being.

BRIEF SUMMARY OF THE INVENTION

An embodiment of the disclosure meets the needs presented above by generally comprising a humanoid animatronic that has a torso, a pair of arms and a pair of hands each is disposed on a respective one of the arms. The arms are positionable in a resting position having the arms extending downwardly along the torso and having a palm of each of the hands facing the torso. Each of the arms is positionable in a hugging position has each of the arms is crossed in front of the torso wherein the pair of arms is configured to embrace the user. A motion sensor is integrated into the humanoid animatronic to sense motion of the user approaching the humanoid animatronic. A motion unit is integrated into the humanoid animatronic and the motion unit actuates each of the arms into the hugging position when a predetermined duration of time has passed when motion sensor senses motion.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a front phantom view of a humanoid hugging assembly according to an embodiment of the disclosure.

FIG. 2 is a front view of an embodiment of the disclosure showing a pair of arms in an invitation position.

DETAILED DESCRIPTION OF THE INVENTION

Figure 4:
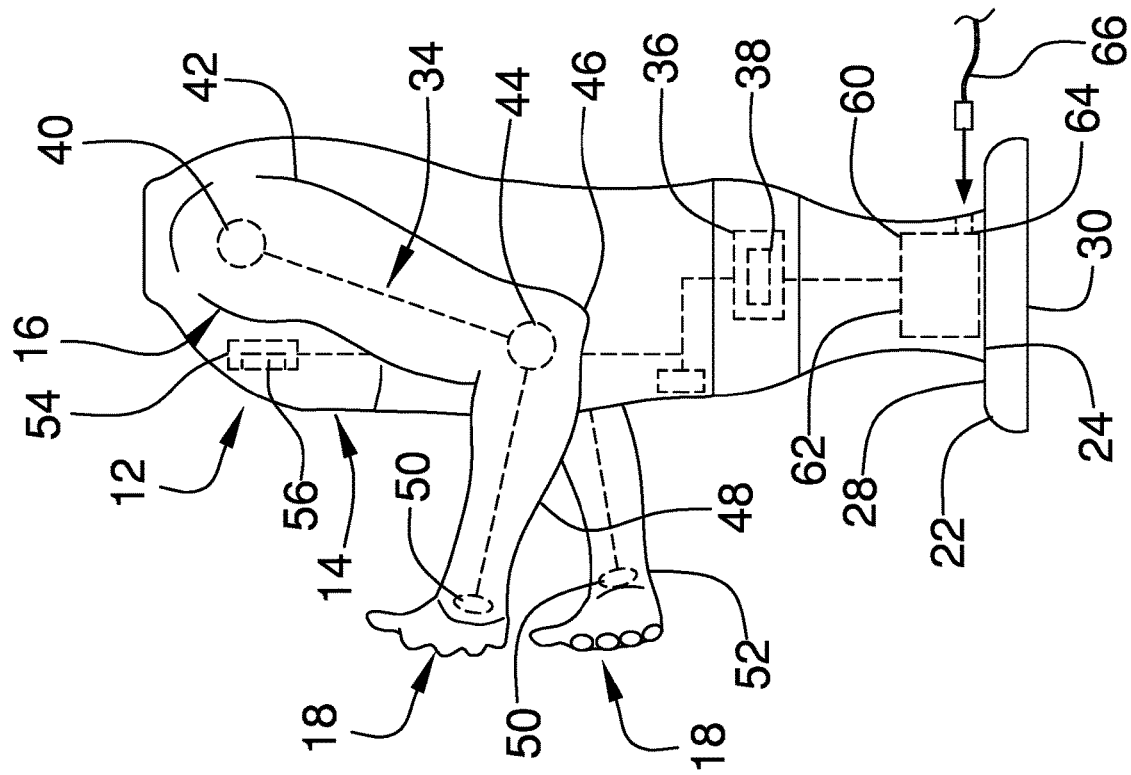
FIG. 4 is a left side phantom view of an embodiment of the disclosure.
Figure 3:
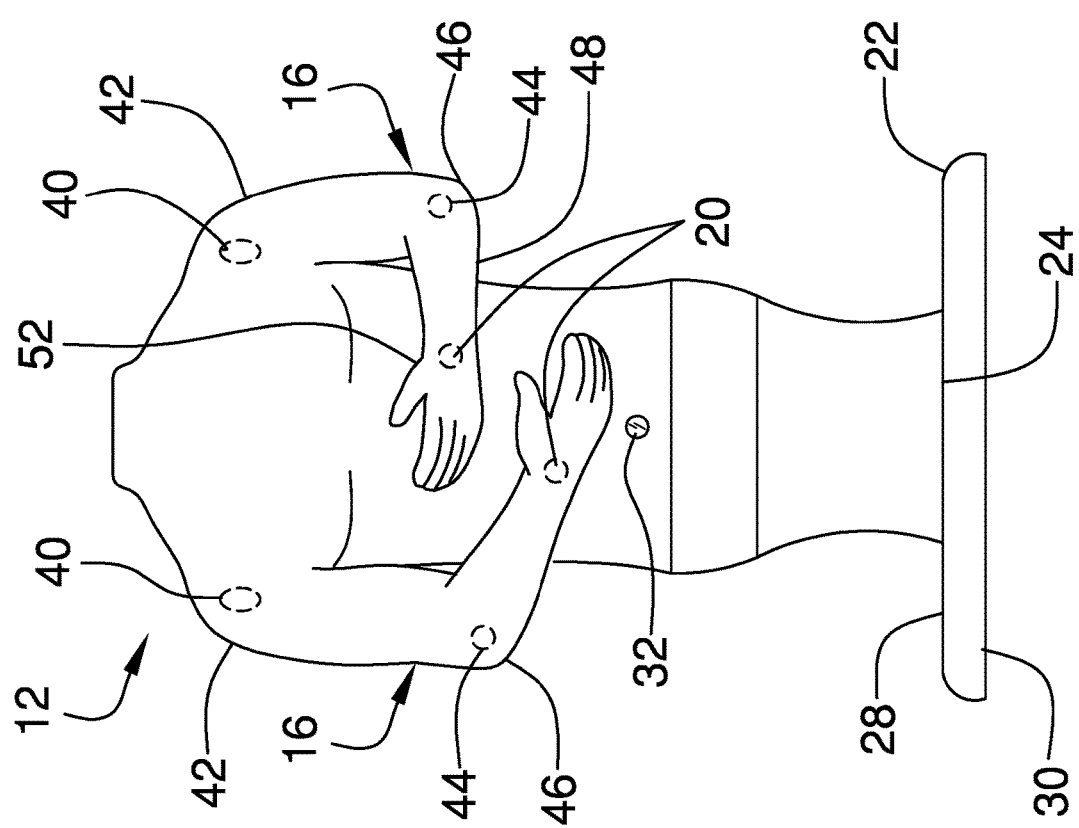
FIG. 3 is a front view of an embodiment of the disclosure showing a pair of arms in a hugging position.
Figure 5:
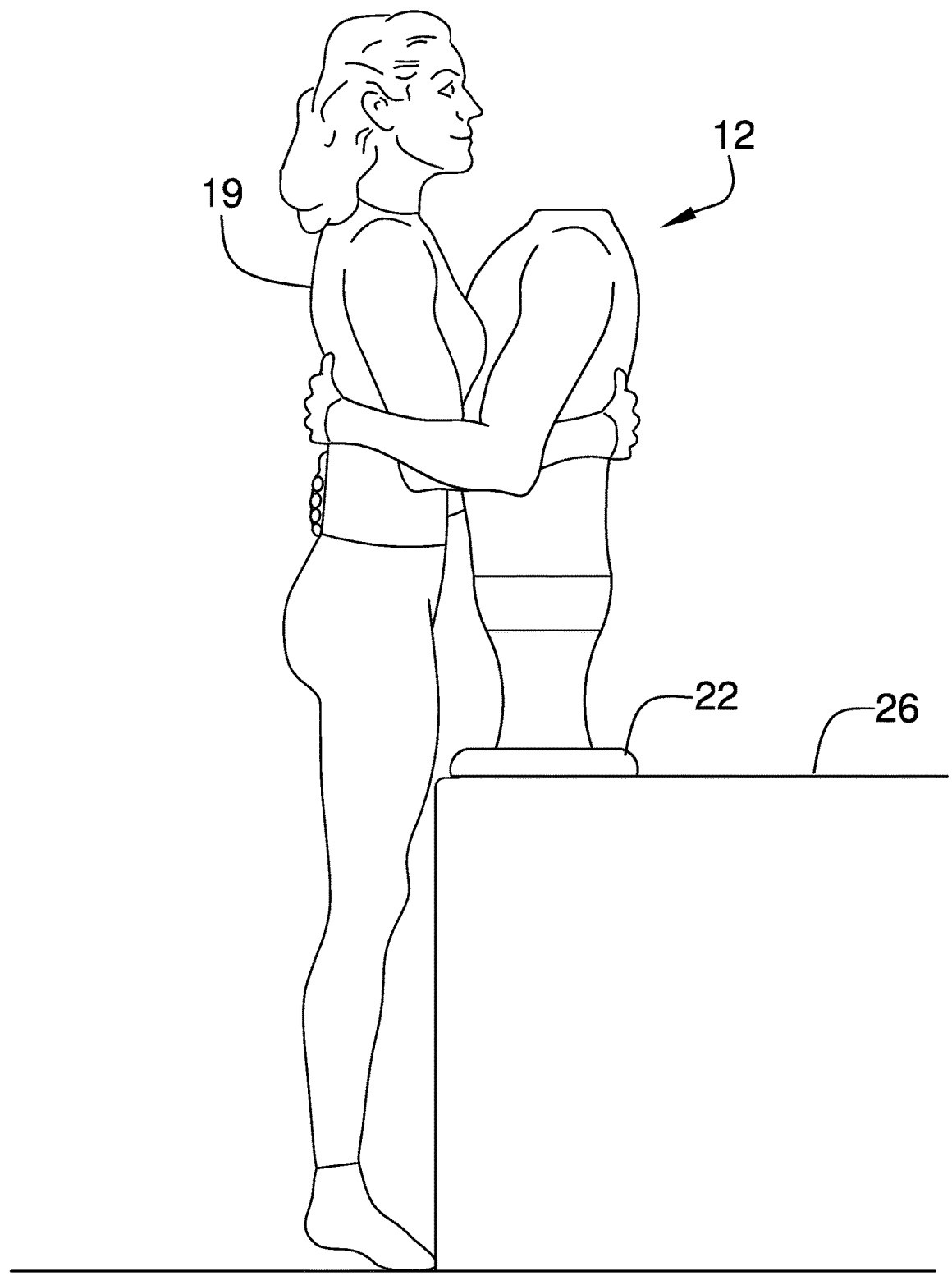
FIG. 5 is a perspective in-use view of an embodiment of the disclosure.

With reference now to the drawings, and in particular to FIGS. 1 through 5 thereof, a new hugging device embodying the principles and concepts of an embodiment of the disclosure and generally designated by the reference numeral 10 will be described.

As best illustrated in FIGS. 1 through 5, the humanoid hugging assembly 10 generally comprises a humanoid animatronic 12 that has a torso 14, a pair of arms 16 and a pair of hands 18 that is each disposed on a respective one of the arms 16. The pair of arms 16 are positionable in a resting position having the arms 16 extending downwardly along the torso 14 and having a palm 20 of each of the hands 18 facing the torso 14. Each of the arms 16 is positionable in an invitation position having each of the arms 16 extending downwardly along the torso 14 and having the palm 20 of each of the hands 18 being directed forwardly with respect to the torso 14. In this way the pair of arms 16 can visually alert a user 19 to approach the humanoid animatronic 12. Furthermore, each of the arms 16 is positionable in a hugging position having each of the arms 16 being crossed in front of the torso 14 to embrace the user 19. The humanoid animatronic 12 may be covered with a skin that simulates the texture and feeling of human skin.

A base 22 is disposed on a bottom end 24 of the torso 14 and the base 22 can be positioned on a support surface 26 having the humanoid animatronic 12 being vertically oriented. The base 22 has an upper surface 28 and a lower surface 30, and the bottom end 24 of the torso 14 is coupled to the upper surface 28. The lower surface 30 rests on the support surface 26. A motion sensor 32 is integrated into the humanoid animatronic 12 to sense motion of the user 19 approaching the humanoid animatronic 12. Additionally, the motion sensor 32 is integrated into a front side of the torso 14. The motion sensor 32 may comprise an electronic motion sensor 32 or the like which has an operational range of approximately 3.0 feet.

A motion unit 34 is integrated into the humanoid animatronic 12 and the motion unit 34 is in mechanical communication with each of the arms 16. The motion unit 34 is in a normally de-actuated condition having each of the arms 16 being positioned in the resting position. The motion unit 34 is actuated into the invitation position when the motion sensor 32 senses motion. Furthermore, the motion unit 34 is actuated into the hugging position when a predetermined duration of time has passed when motion sensor 32 senses motion.

The motion unit 34 comprises a control circuit 36 that is integrated into the humanoid animatronic 12. The control circuit 36 receives an invitation input, a hug input and a de-actuate input. The control circuit 36 includes an electronic timer 38 and the electronic timer 38 counts down a pre-determined duration of time when the control circuit 36 receives the hug input. Furthermore, the control circuit 36 receives the de-actuate input when the electronic timer 38 finishes counting down the pre-determined duration of time.

The motion unit 34 includes a pair of shoulder servos 40 and each of the shoulder servos 40 is disposed in a shoulder 42 of a respective one of the arms 16. Each of the shoulder servos 40 is electrically coupled to the control circuit 36 and each of the shoulder servos 40 is actuated to urge each of the arms 16 into the hugging position when the control circuit 36 receives the hug input. Additionally, each of the shoulder servos 40 is actuated to urge each of the arms 16 into the resting position when the control circuit 36 receives the de-actuate input. Each of the shoulder servos 40 may comprise an electro-mechanical servo that might commonly be employed in robotics or other similar applications.

The motion unit 34 includes a pair of elbow servos 44 that is each disposed in an elbow 46 of a respective one of the arms 16 and each of the elbow servos 44 is electrically coupled to the control circuit 36. Each of the elbow servos 44 is actuated to urge a forearm 48 of the respective arm 16 into a perpendicular orientation with an upper arm of the respective arm when the control circuit 36 receives the hug input. Furthermore, each of the elbow servos 44 is in a normally de-actuated condition having the forearm 48 being oriented colinear with the upper arm. Each of the elbow servos 44 is de-actuated when the control circuit 36 receives the de-actuate input. Each of the elbow servos 44 may comprise an electro-mechanical servo that might commonly be employed in robotics or other similar applications.

The motion unit 34 includes a pair of wrist servos 50 that is each disposed in a wrist 52 of a respective one of the arms 16 and each of the wrist servos 50 is electrically coupled to the control circuit 36. Each of the wrist servos 50 is actuated to rotate a respective one of the hands 18 such that the palm 20 of each of the hands 18 faces forwardly when the control circuit 36 receives the invitation input. Additionally, each of the wrist servos 50 is actuated to rotate the respective hand 18 such that the palm 20 of the respective hand 18 faces the torso 14 when the control circuit 36 receives the hug input. Each of the wrist servos 50 is de-actuated when the control circuit 36 receives the de-actuate input. Moreover, each of the wrist servos 50 may comprise an electro-mechanical servo that might commonly be employed in robotics or other similar applications.

An electronic memory 54 is integrated into the humanoid animatronic 12 and the electronic memory 54 is electrically coupled to the control circuit 36. The electronic memory 54 stores data comprising a plurality of verbal phrases of affirmation. The verbal phrases of affirmation may include, but not be limited to, "I know you need a hug", "Come get a hug" and "You are special". A speaker 56 is integrated into the humanoid animatronic 12 to emit audible sound outwardly therefrom. The speaker 56 is integrated into a chest 58 of the torso 14 such that the speaker 56 is directed toward a head of the user 19 when the user 19 approaches the humanoid animatronic 12. The speaker 56 is electrically coupled to the control circuit 36 and the speaker 56 is turned on when the control circuit 36 receives the hug input.

A power supply 60 is integrated into the humanoid animatronic 12 and the power supply 60 is electrically coupled to the control circuit 36. The power supply 60 comprises a rechargeable battery 62 that is integrated into the humanoid animatronic 12 and the rechargeable battery 62 is electrically coupled to the control circuit 36. A charge port 64 is recessed into the humanoid animatronic 12 to receive a charge cord 66. The charge port 64 is electrically coupled to the rechargeable battery 62 for charging the rechargeable battery 62. Additionally, the charge port 64 may comprise a usb port or other type of charge port 64.

In use, the humanoid animatronic 12 is positioned on a support surface 26, such as a dresser or a table or other horizontal support surface 26 that places the humanoid animatronic 12 at an appropriate height to hug the user 19. The arms 16 are urged into the invitation position when the user 19 approaches the humanoid animatronic 12 to alert the user 19 to approach the humanoid animatronic 12 for a hug. The arms 16 are urged into the hugging position when the arms 16 are in the invitation position for a pre-determined duration of time. In this way the user 19 can receive a warm embrace from the humanoid animatronic 12. Additionally, the speaker 56 emits one or more of the verbal phrases of affirmation while the user 19 is being embraced. The arms 16 are returned to the resting position after a pre-determined duration of time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A humanoid hugging assembly for facilitating a user to receive a hug, said assembly comprising:
   a humanoid animatronic having a torso and a pair of arms and a pair of hands each being disposed on a respective one of said arms, said pair of arms being positionable in a resting position having said arms extending downwardly along said torso and having a palm of each of said hands facing said torso, each of said arms being positionable in an invitation position having each of said arms extending downwardly along said torso and having said palm of each of said hands being directed forwardly with respect to said torso wherein said pair of arms is configured to visually alert a user to approach said humanoid animatronic, each of said arms being positionable in a hugging position having each of said arms being crossed in front of said torso wherein said pair of arms is configured to embrace the user;
   a base being disposed on a bottom end of said torso wherein said base is configured to be positioned on a support surface having said humanoid torso being vertically oriented;
   a motion sensor being integrated into said humanoid animatronic wherein said motion sensor is configured to sense motion of the user approaching said humanoid animatronic;
   a motion unit being integrated into said humanoid animatronic, said motion unit being in mechanical communication with each of said arms, said motion unit being in a normally de-actuated condition having each of said arms being positioned in said resting position, said motion unit actuating each of said arms into said invitation position when said motion sensor senses motion, said motion unit actuated each of said arms into said hugging position when a predetermined duration of time has passed when motion sensor senses motion;
   wherein said motion unit comprises a control circuit being integrated into the humanoid animatronic, said control circuit receiving an invitation input, said control circuit receiving a hug input, said control circuit receiving a de-actuate input, said control circuit including an electronic timer, said electronic timer counting, down a pre-determined duration of time when said control circuit receives said hug input, said control circuit receiving said de-actuate input when said electronic timer finishes counting down said pre-determined duration of time; and
   wherein said motion unit includes a pair of wrist servos, each of said wrist servos being disposed in a wrist of a respective one of said arms, each of said wrist servos being electrically coupled to said control circuit, each of said wrist servos being actuated to rotate a respective one of said hands such that said palm of each of said hands faces forwardly when said control circuit receives said invitation input, each of said wrist servos being actuated to rotate said respective hand such that said palm of said respective hand faces said torso when said control circuit receives said hug input, each of said wrist servos being de-actuated when said control circuit receives said de-actuate input.

2. The assembly according to claim 1, wherein said motion unit includes a pair of shoulder servos, each of said shoulder servos being disposed in a shoulder of a respective one of said arms, each of said shoulder servos being electrically coupled to said control circuit, each of said shoulder servos being actuated to urge each of said arms into said hugging position When said control circuit receives said hug input, each of said shoulder servos being actuated to urge each of said arms into said resting position when said control circuit receives said de-actuate input.

3. The assembly according to claim 1, wherein said motion unit includes a pair of elbow servos, each of said elbow servos being disposed in an elbow of a respective one of said arms, each of said elbow servos being electrically coupled to said control circuit, each of said elbow servos being actuated to urge a forearm of said respective arm into a perpendicular orientation with an upper arm of said respective arm when said control circuit receives said hug input, each of said elbow servos being in a normally de-actuated condition having said tbrearm being oriented colinear with said upper arm, each of said elbow servos de-actuated when said control circuit receives said de-actuate input.

4. The assembly according to claim 1, further comprising:
   an electronic memory being integrated into said humanoid animatronic, said electronic memory being electrically coupled to said control circuit, said electronic memory storing data comprising a plurality of verbal phrases of affirmation; and
   a speaker being integrated into said humanoid animatronic wherein said speaker is configured to emit audible sound outwardly therefrom, said speaker being integrated into a chest of said torso Wherein said speaker is configured to be directed toward a head of the user when the user approaches said humanoid animatronic, said speaker being electrically coupled to said control circuit, said speaker being turned on when said control circuit receives said hug input.

5. The assembly according to claim 1, further comprising a power supply being integrated into said humanoid animatronic, said power supply being electrically coupled to said control circuit, said power supply comprising:
   a rechargeable battery being integrated into said humanoid animatronic, said rechargeable battery being electrically coupled to said control circuit; and
   a charge port being recessed into said humanoid animatronic wherein said charge port is configured to receive a charge cord, said charge port being electrically coupled to said rechargeable battery for charging said rechargeable battery.

6. A humanoid hugging assembly for facilitating a user to receive a hug, said assembly comprising:
   a humanoid animatronic having a torso and a pair of arms and a pair of hands each being disposed on a respective one of said arms, said pair of arms being positionable in a resting position having said arms extending downwardly along said torso and having a palm of each of said hands facing said torso, each of said arms being positionable in an invitation position having each of said arms extending downwardly along said torso and having said paint of each of said hands being directed forwardly with respect to said torso wherein said pair of arms is configured to visually alert a user to approach said humanoid animatronic, each of said arms being positionable in a hugging position having each of said arms being crossed in front of said torso wherein said pair of arms is configured to embrace the user;
   a base being disposed on a bottom end of said torso wherein said base is configured to be positioned on a support surface having said humanoid torso being vertically oriented, said base having an upper surface and a lower surface, said bottom end of said torso being coupled to said upper surface wherein said lower surface is configured to rest on the support surface;

a motion sensor being integrated into said humanoid animatronic wherein said motion sensor is configured to sense motion of the user approaching said humanoid animatronic, said motion sensor being integrated into a front side of said torso;

a motion unit being integrated into said humanoid animatronic, said motion unit being in mechanical communication with each of said arms, said motion unit being in a normally de-actuated condition having each of said arms being positioned in said resting position, said motion unit actuating each of said arms into said invitation position when said motion sensor senses motion, said motion unit actuating each of said arms into said hugging position when a predetermined duration of time has passed when motion sensor senses motion, said motion unit comprising:

a control circuit being integrated into the humanoid animatronic, said. control circuit receiving an invitation input, said control circuit receiving a hug input, said control circuit receiving a de-actuate input, said control circuit including an electronic timer, said electronic timer counting down a pre-determined duration of time when said control circuit receives said hug input, said control circuit receiving said de-actuate input when said electronic timer finishes counting down said pre-determined duration of time;

a pair of shoulder servos, each of said shoulder servos being disposed in a shoulder of a respective one of said arms, each of said shoulder servos being electrically coupled to said control circuit, each of said shoulder servos being actuated to urge each of said arms into said hugging position when said control circuit receives said hug input, each of said shoulder servos being actuated to urge each of said arms into said resting position when said control circuit receives said de-actuate input;

a pair of elbow servos, each of said elbow servos being disposed in an elbow of a respective one of said arms, each of said elbow servos being electrically coupled to said control circuit, each of said elbow servos being actuated to urge a forearm of said respective arm into a perpendicular orientation with an upper arm of said respective arm when said control circuit receives said hug input, each of said elbow servos being in a normally de-actuated condition having said forearm being oriented coli near with said upper arm, each of said elbow servos de-actuated when said control circuit receives said de-actuate input; and a pair of wrist servos, each of said wrist servos being disposed in a wrist of a respective one of said arms, each of said wrist servos being electrically coupled to said control circuit, each of said wrist servos being actuated to rotate a respective one of said hands such that said palm of each of said hands faces forwardly when said control circuit receives said invitation input, each of said wrist servos being actuated to rotate said respective hand such that said palm of said respective hand faces said torso when said control circuit receives said hug input, each of said wrist servos being de-actuated when said control circuit receives said de-actuate input;

an electronic memory being integrated into said humanoid animatronic, said electronic memory being electrically coupled to said control circuit, said electronic memory storing data comprising a plurality of verbal phrases of affirmation;

a speaker being integrated into said humanoid animatronic wherein said speaker is configured to emit audible sound outwardly therefrom, said speaker being integrated into a chest of said torso wherein said speaker is configured to be directed toward a head of the user when the user approaches said humanoid animatronic, said speaker being electrically coupled to said control circuit, said speaker being turned on when said control circuit receives said hug input; and a power supply being integrated into said humanoid animatronic, said power supply being electrically coupled to said control circuit, said power supply comprising:

a rechargeable battery being integrated into said humanoid animatronic, said rechargeable battery being electrically coupled to said control circuit; and a charge port being recessed into said humanoid animatronic wherein said charge port is configured to receive a charge cord, said charge port being electrically coupled to said rechargeable battery for charging said rechargeable battery.

\* \* \* \* \*